(12) United States Patent
Rogers et al.

(10) Patent No.: US 10,525,543 B2
(45) Date of Patent: Jan. 7, 2020

(54) MULTI-AXIS METALLIC PROCESSING BEVEL HEAD

(71) Applicants: Travis Allen Rogers, Benton, AR (US); John Anthony Lahmann, Benton, AR (US); Jay Stewart Tolson, Little Rock, AR (US)

(72) Inventors: Travis Allen Rogers, Benton, AR (US); John Anthony Lahmann, Benton, AR (US); Jay Stewart Tolson, Little Rock, AR (US)

( * ) Notice: Subject to any disclaimer, the term of this patent is extended or adjusted under 35 U.S.C. 154(b) by 216 days.

(21) Appl. No.: 15/668,446

(22) Filed: Aug. 3, 2017

(65) Prior Publication Data

US 2018/0036821 A1    Feb. 8, 2018

Related U.S. Application Data

(60) Provisional application No. 62/370,586, filed on Aug. 3, 2016.

(51) Int. Cl.
| | |
|---|---|
| *B23K 7/10* | (2006.01) |
| *B23K 7/00* | (2006.01) |
| *B23K 10/02* | (2006.01) |
| B23K 37/02 | (2006.01) |
| F16H 48/08 | (2006.01) |

(52) U.S. Cl.
CPC .............. *B23K 7/102* (2013.01); *B23K 7/001* (2013.01); *B23K 10/02* (2013.01); *B23K 37/0241* (2013.01); *F16H 2048/087* (2013.01)

(58) Field of Classification Search
CPC .................................. B23K 7/102; B23K 7/001
See application file for complete search history.

(56) References Cited

U.S. PATENT DOCUMENTS

| | | | |
|---|---|---|---|
| 8,378,250 B2 * | 2/2013 | Flaig | B23K 7/001 219/121.44 |
| 2012/0242015 A1 * | 9/2012 | Fagan | B23K 37/0288 266/59 |
| 2018/0036821 A1 * | 2/2018 | Rogers | B23K 7/001 |

* cited by examiner

Primary Examiner — Scott R Kastler

(57) ABSTRACT

A bevel head assembly is shown capable of fine motor control of a cutting tool (for instance, a laser or plasma cutter) in three simultaneous dimensions of movement. A rack-and-pinion system moves the bevel head assembly and cutter up and down in the Z-axis while a rotational motor attached to the rack-and-pinion system moves the bevel head assembly in a first rotational (X) axis, and a linear actuator pivotally connected to the cutting tool is mounted to the rotational motor to move the bevel head assembly in a second (Y) rotational axis.

16 Claims, 10 Drawing Sheets

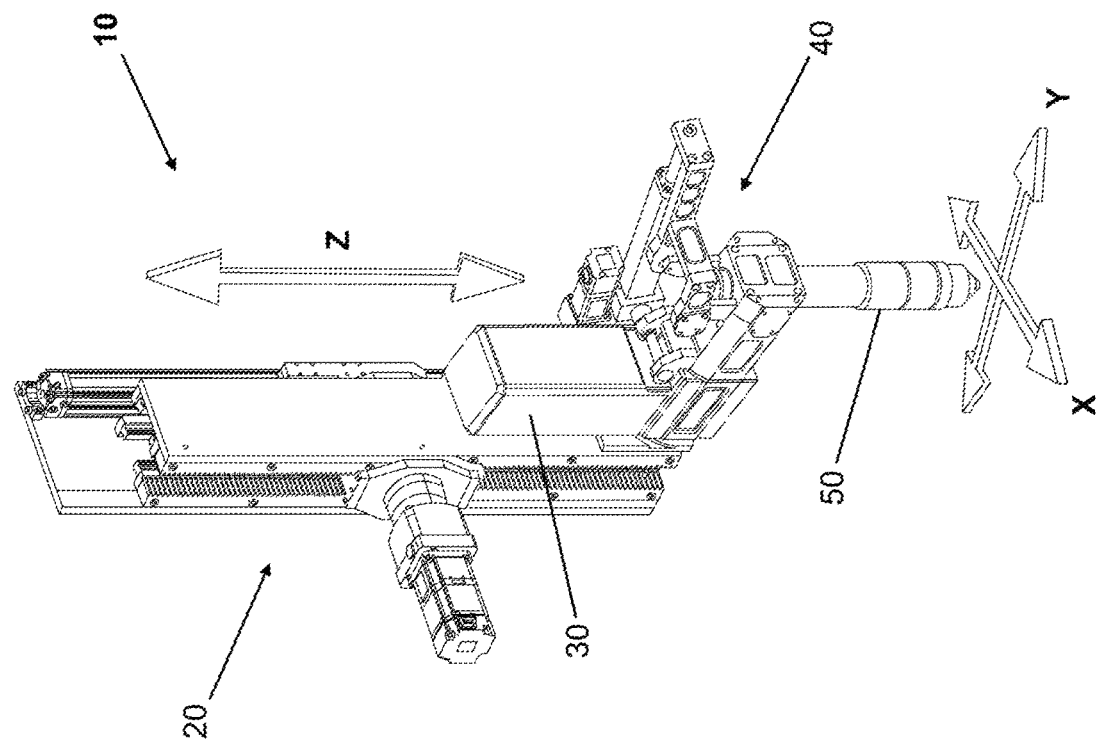

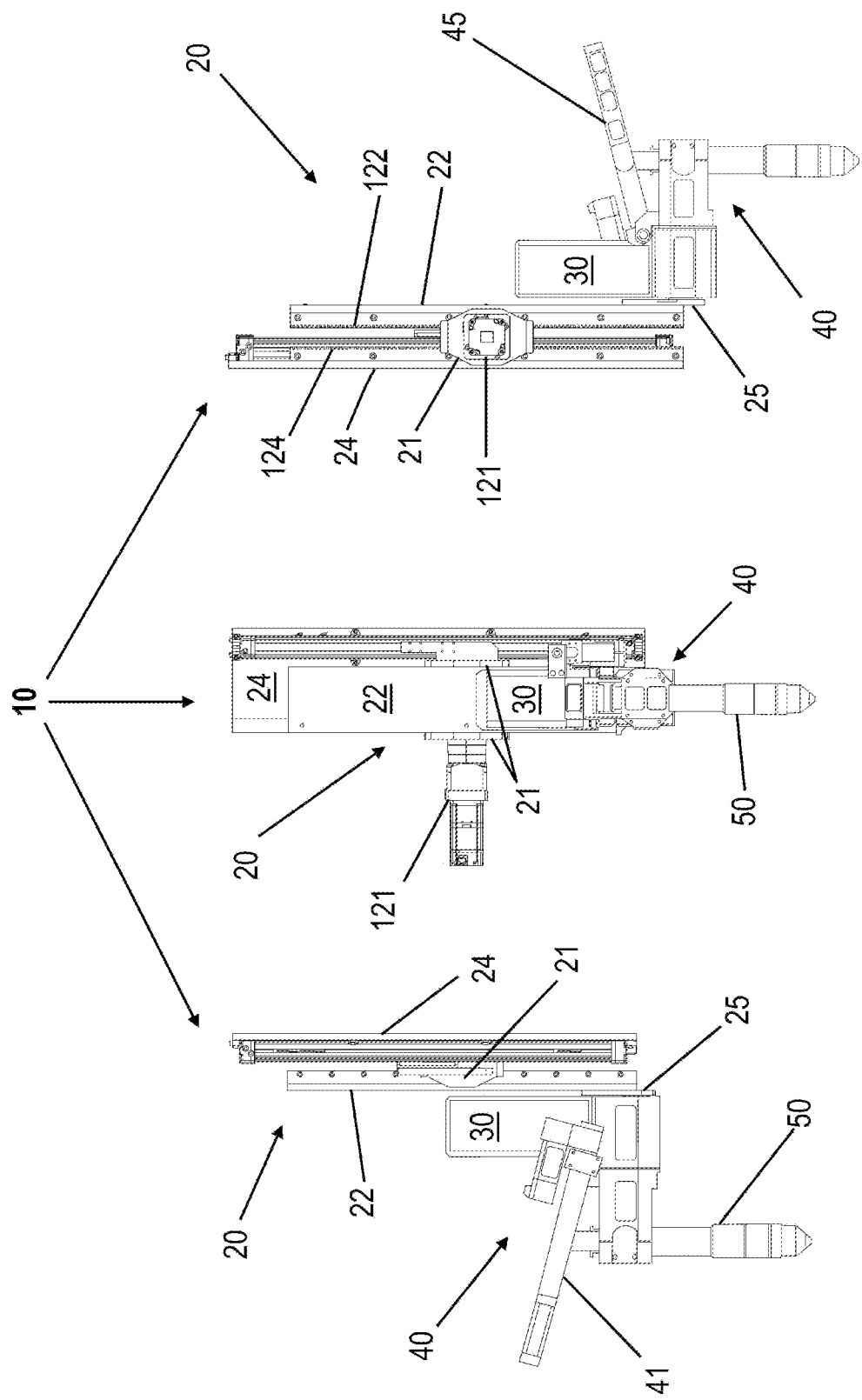

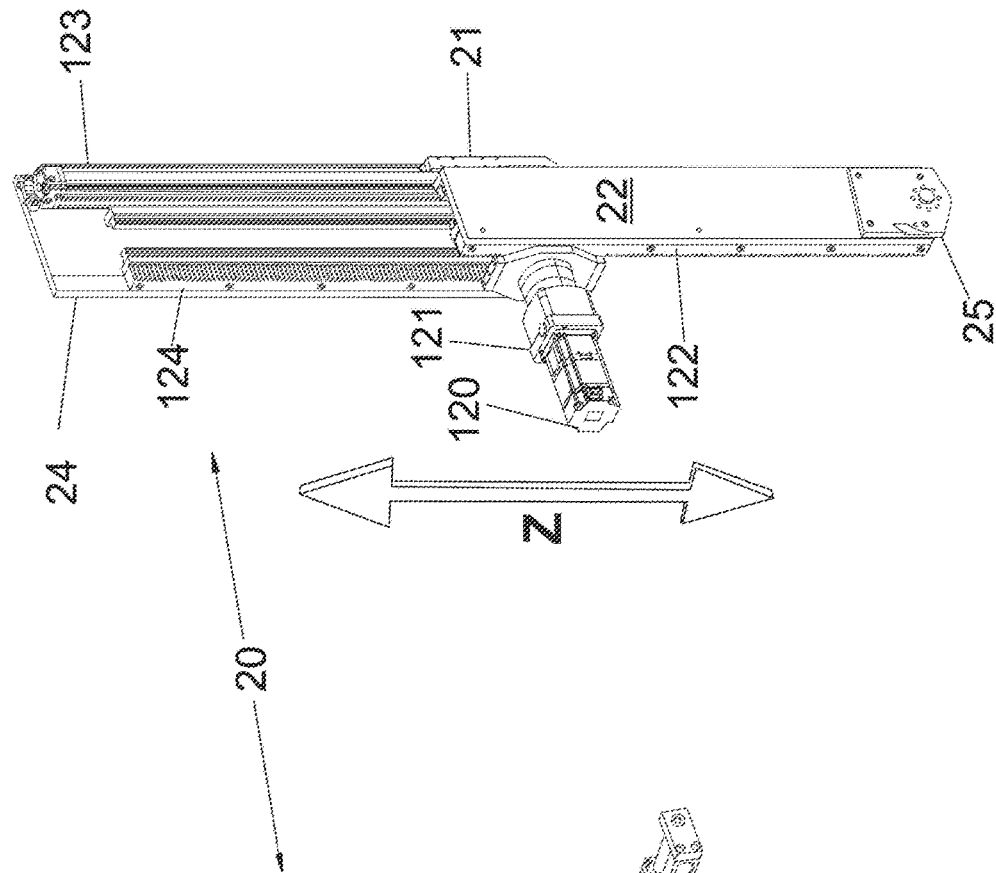
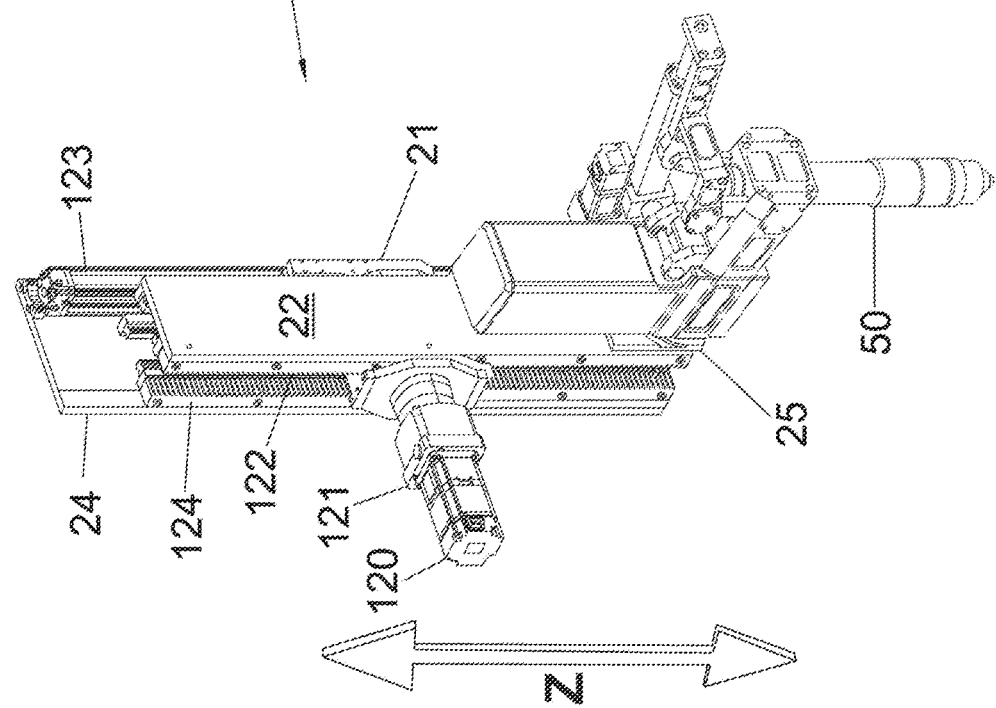
FIG. 3A
FIG. 3B

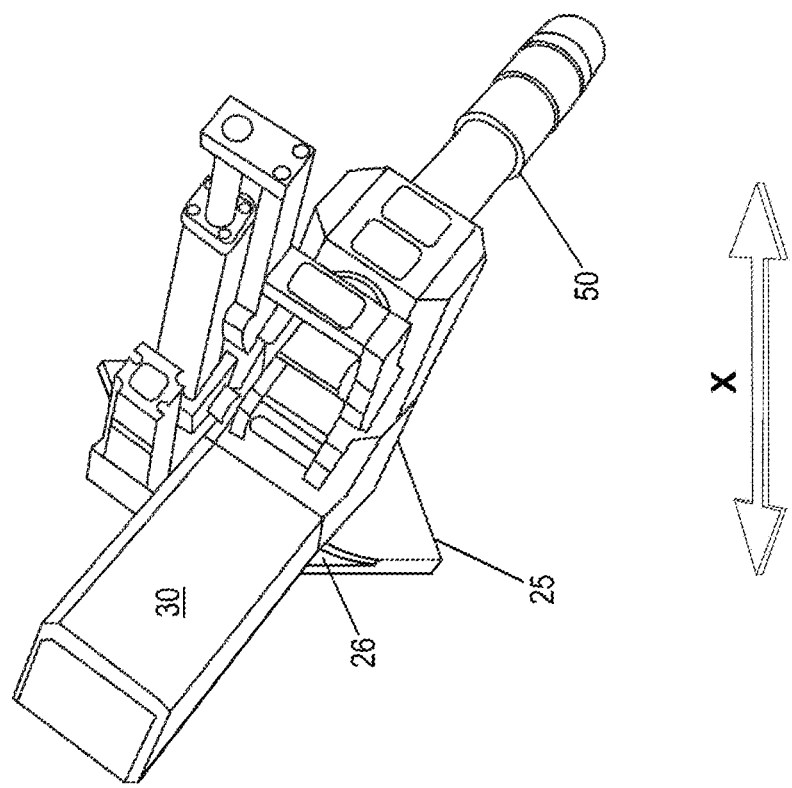
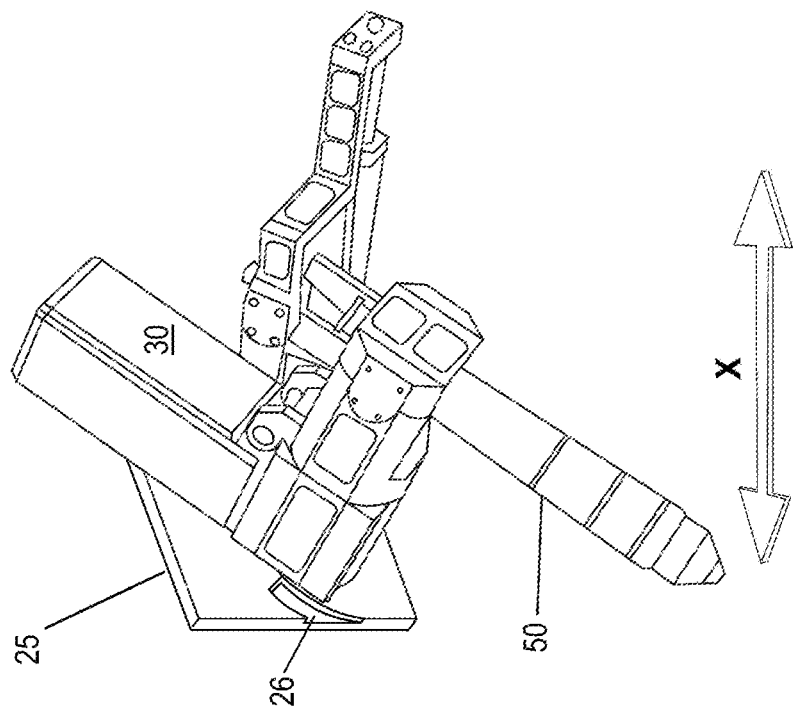

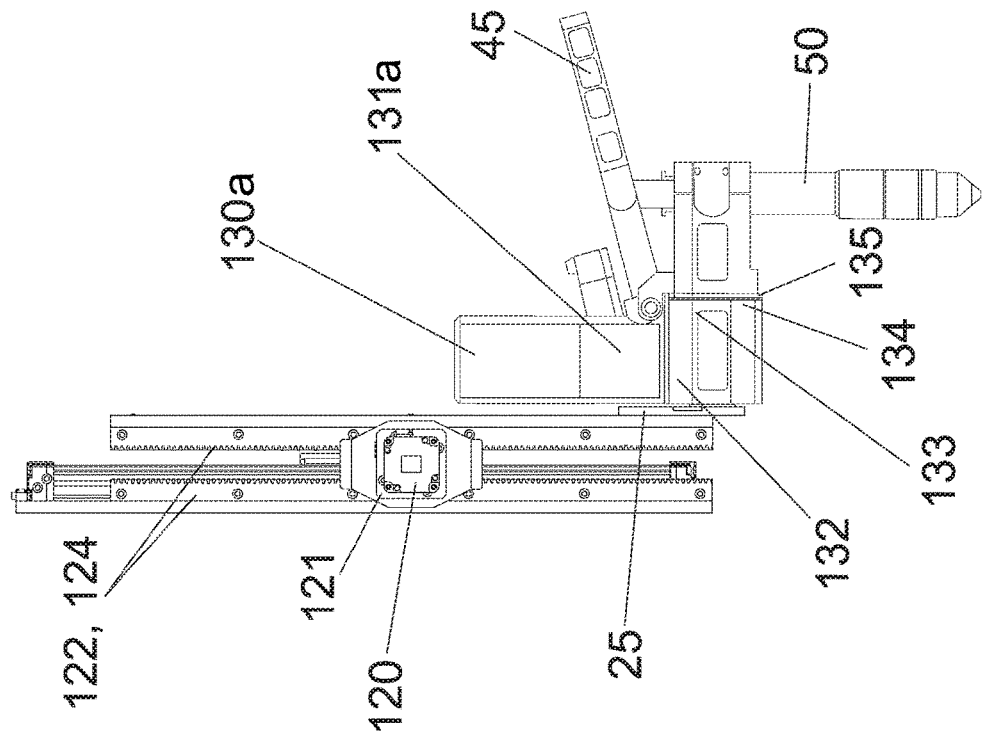
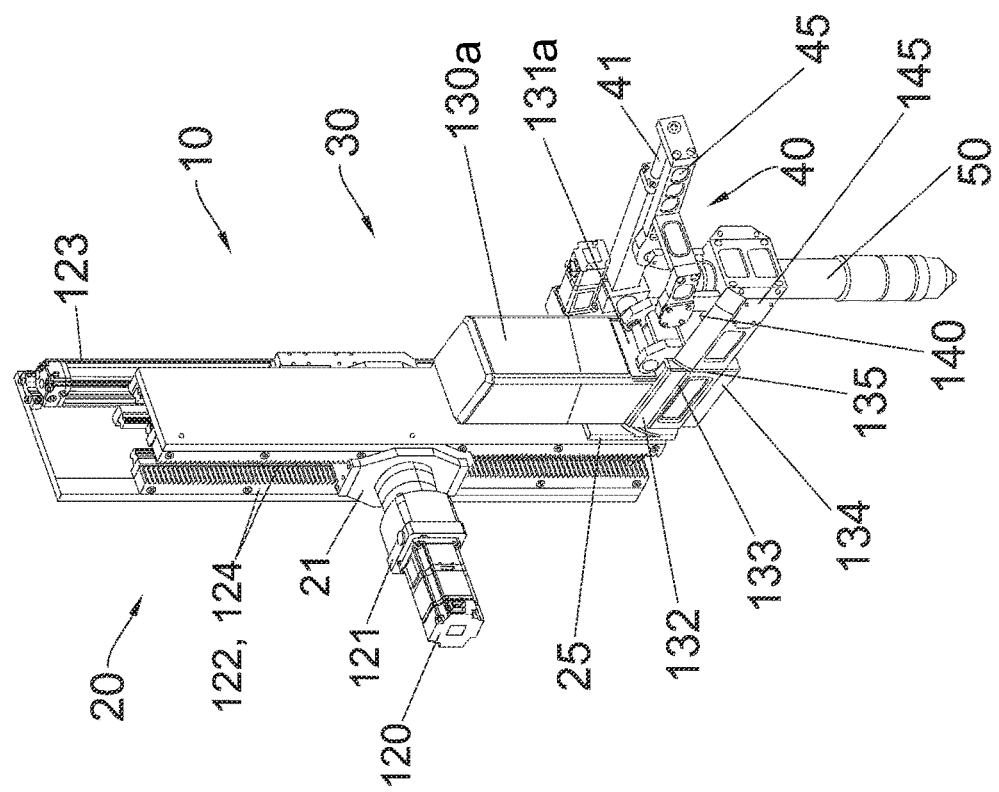

MULTI-AXIS METALLIC PROCESSING BEVEL HEAD

STATEMENT OF PRIORITY

The present application claims priority to U.S. Provisional Application No. 62/370,586, entitled "Multi-Axis Metallic Processing Bevel Head," and filed by the inventors on 3 Aug. 2016. The contents of this provisional application are incorporated herein by reference.

FIELD OF THE INVENTION

The present invention relates, generally, to the field of computer-controlled metallic processing devices. In particular, the invention relates to a three axis gantry-mounted head assembly for directing a plasma cutting torch or similar metallic processing device along two rotational axes, as well as a linear Z-axis. This allows the torch to be angled in any direction, allowing the plasma torch to be at any desired angle and along any desired vector on the surface being processed.

BACKGROUND

Plasma cutters and plasma cutting tables are well-known in the art for cutting, welding, and shaping metallic workpieces. Generally, these apparatuses involve mounting a plasma cutting torch onto a "head" piece, which is then used to shape a workpiece through direct manipulation of the cutting head about the workpiece.

However, bevel heads are most commonly used to cut flat plate shapes, and cutting in both plate and profile can be problematic for these plasma cutting torches. An example of such a problematic shape is a W profile, or I-beam, which requires the cutting torch to create an angled cut on the web of the workpiece.

Often these beveled cuts can be difficult to accomplish because the workpiece limits the depth to which these beveled cuts can be achieved. In addition, the bevel heads themselves often have limited ranges of motion due to the size of the torch holder and minimum amount of space available for movement in between the flanges.

Thus, a need exists for a beveling cutting head which is capable of maneuvering in limited space and more compact than cutting heads currently existing in the art.

Embodiments described in the present application meet this need.

DRAWINGS

FIG. 1 shows a perspective view of an embodiment of the bevel head cutter, and the three axes of movement enabled.

FIGS. 2A-2C show a right side, front, and left side view, respectively, of an embodiment of the bevel head cutter.

FIGS. 3A-3B show an embodiment of the bevel head showing action along the Z-axis.

FIGS. 6A-6B show an embodiment of the bevel head showing action along the X-axis.

FIG. 8 shows a perspective view of the bevel head assembly with additional components labeled.

FIG. 9 shows a side view of the bevel head assembly with additional components labeled.

DETAILED DESCRIPTION

Figure 5:
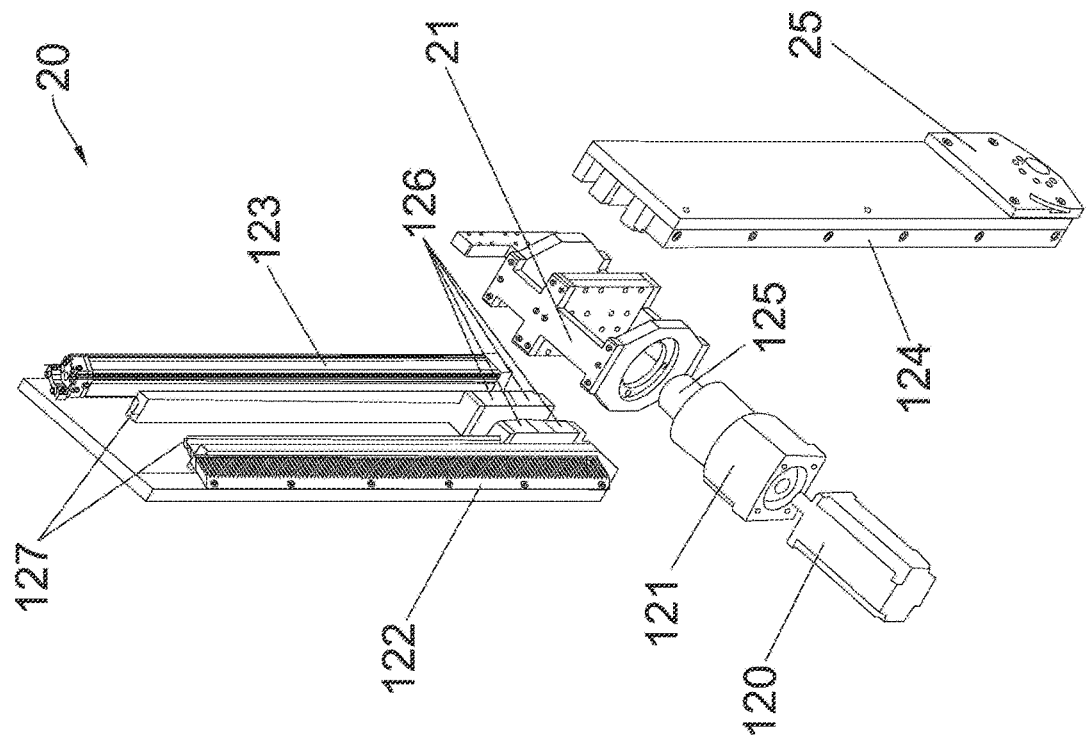
FIG. 5 shows the embodiment of the Z-axis motor assembly in an exploded view.

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

Beginning with FIG. 1, an exemplary embodiment of the bevel head assembly 10 is shown, which comprises a Z-axis assembly 20, a rotation motor assembly 30, an actuator assembly 40, and a torch 50. As illustrated by FIG. 1, the components of bevel head assembly 10 confer, on torch 50, three independent axes of operation. Z-axis assembly 20 comprises a linear dual-action vertical axis, which can allow movement of the torch up and down. Rotation motor assembly 30 can allow the torch 50 to be angled along a first horizontal axis X. Actuator assembly 40 can allow the torch 50 to be angled along a second horizontal axis Y perpendicular to the first horizontal axis X.

For the purposes of this disclosure, the first horizontal axis controlled by the rotation motor assembly 30 is designated as the X-axis, and the second horizontal axis controlled by the actuator assembly 40 is designated as the Y-axis. Torch 50 can be moved along all three axes of operation simultaneously, allowing the torch 50 to cut at any desired angle relative to the workpiece being processed.

Turning now to FIGS. 2A-2C, the external components of the bevel head assembly 10 are illustrated in greater detail. The Z-axis assembly 20 comprises a first rack 122 and a second rack 124, attached to a front mount plate 22 and back mount plate 24, respectively. Racks 122, 124 can each connect to Z-motor gearbox 121 via the Z axis motor mount assembly 21. The remainder of the bevel head assembly 10 can be attached to front mount plate 22 via rotation motor mount 25. As shown, actuator assembly 40 comprises a linear actuator 41, which can be attached to the torch 50 via a pivoting arm 45 that can be located on the opposite side of the actuator assembly 40, as shown.

Turning now to FIGS. 3A-3B, the extending action of the Z-axis assembly 20 is illustrated, with FIG. 3A showing the torch 50 positioned at approximately the center of travel between full extension and full retraction, and FIG. 3B showing the torch 50 lowered to its full downward extension along the Z-axis (the remainder of the bevel head assembly 10 is omitted from FIG. 3B for clarity). In this embodiment, Z-motor gearbox 121, powered by Z-motor 120, travels along front mount plate 22 and back mount plate 24 by using racks 122 and 124, respectively, which face internally. Thus, the rotation motor mount 25 and torch 50 can be lowered or raised in the Z-axis based on the travel of Z-motor gearbox 121 along front mount plate 22 and back mount plate 24, respectively. Other variations are apparent to those of ordinary skill in the art, e.g., an embodiment in which Z-motor gearbox 121 travels along a single lengthy rack.

As shown in FIGS. 3A-3B, racks 122, 124 can be driven in or out of vertical alignment by Z-motor 120 and Z-motor gearbox 121, which are further attached to a motor mount assembly 21, which is visible on the far side of the front and back mount plates 22, 24, respectively (Z-axis motor mount assembly 21 extends through the Z-axis assembly 20 laterally, as described below). Counterweight 123 offsets the weight of the Z-motor 120, Z-motor gearbox 121, front mount plate 22 and all components attached to it, and the remainder of bevel head assembly 10.

Figure 4:
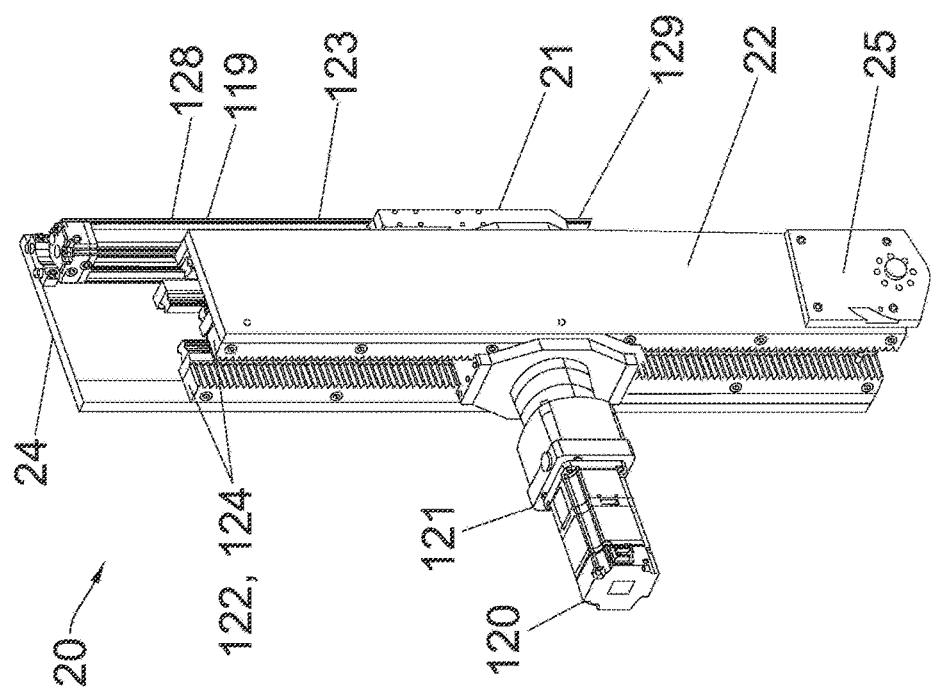
FIG. 4 shows an embodiment of the Z-axis motor assembly in isolation with the remainder of the bevel head cutter omitted for clarity

Turning now to FIGS. 4-5, further detail of Z-axis assembly 20 is shown in a far side view and an exploded view. As shown, Z-axis motor mount assembly 21 runs through the Z-axis assembly laterally, supporting Z-motor 120, Z-motor gearbox 121, and linear bearings 126. Pinion 125 can be positioned internal to the Z-motor gearbox 121 and can engage with the racks 122, 124. Linear bearings 126 and linear rails 127 are depicted for aligning Z-axis motor mount assembly 21 as it travels up and down the Z-axis racks 122, 124. As shown in this embodiment, home switch 119 initializes the vertical position of the Z-axis assembly 20 along linear rails 127, while positive overtravel 128 and negative overtravel 129 prevent overextension of the Z-axis assembly 20.

Turning now to FIGS. 6A-6B, the movement of the torch 50 in the X-axis by the rotation motor assembly 30 (also shown in FIG. 2A, FIG. 2B, and FIG. 2C) is illustrated. Rotation motor mount 25 is shown in close-up, with the Z-axis assembly 20 omitted for clarity (as shown in FIGS. 3A-3B, rotation motor mount 25 is attached to front mount plate 22). Rotation motor assembly 30 can be rotatably attached to the rotation motor mount 25, which additionally comprises groove 26. This movement may take place concurrently with the movement in the Z-axis or the Y-axis (illustrated further in the disclosure).

Figure 7:
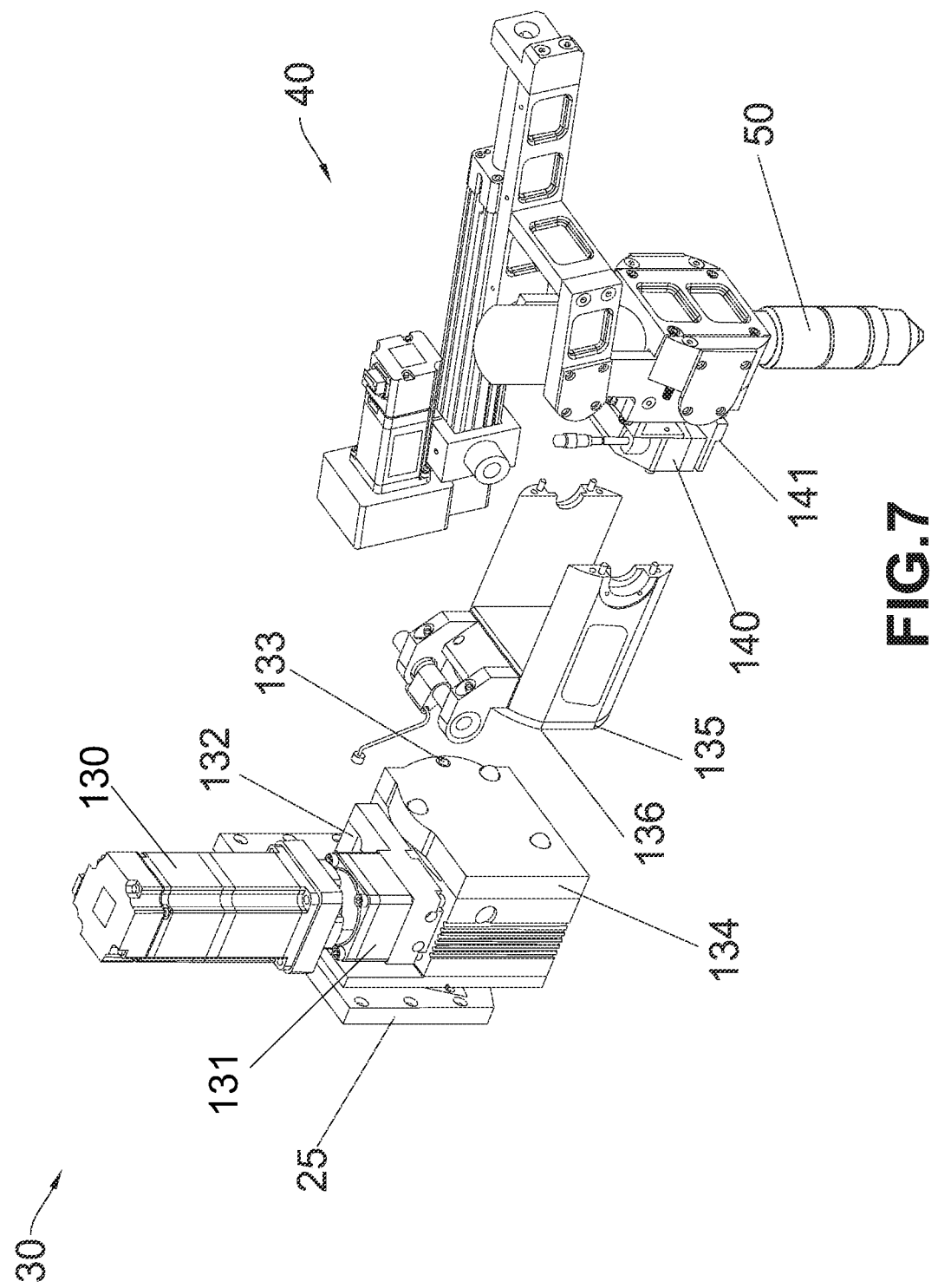
FIG. 7 shows the two rotational motor assemblies (X-axis and Y-axis) in a disassembled view.

Turning now to FIG. 7, a partially disassembled view of the rotation motor assembly 30 and actuator assembly 40 is shown. Crash magnet 136 protects the assembly from contact with sudden debris or the workpiece by allowing the entire actuator assembly 40, not just the torch 50, to disconnect from the larger structure in the event of an emergency. As further shown, the rotation motor assembly 30 can comprise a home switch 132 for initializing the rotational position along the x axis by orienting home switch 132 within groove 26 (previously shown in FIGS. 6A-6B) of rotation motor mount 25, thereby allowing calibration with respect to a neutral position based on the known angle of groove 26.

Magnetic crash plate 134 on rotation motor assembly 30 can align with the crash alignment plate 135, and magnetic crash plate 134 and crash alignment plate 135 are attached to each other with crash magnet 136. As shown, crash detect switch 133 is positioned so that it detects when crash alignment plate 135 is in its proper position. In the case where torch 50 crashes into an unexpected object, actuator assembly 40 will break away from the overall bevel head assembly 10, where the crash alignment plate 135 is attached. When the crash alignment plate 135 has moved too far away from the crash detect switch 133, a signal is sent to the CNC (computerized numerical controller, not shown) to shut off the bevel head assembly 10.

Turning now to FIGS. 8-9, a view of the bevel head assembly 10 is shown with the rotation motor assembly 30 assembled. As assembled, the rotation motor assembly 30 comprising rotational motor 130 and a rotational gearbox 131 is obscured by covers 130a and 131a (these covers may be omitted in some embodiments). Overtravel switch 137 (not visible but shown in FIG. 11) detects when the rotation extends too far in either direction.

Figure 10B:
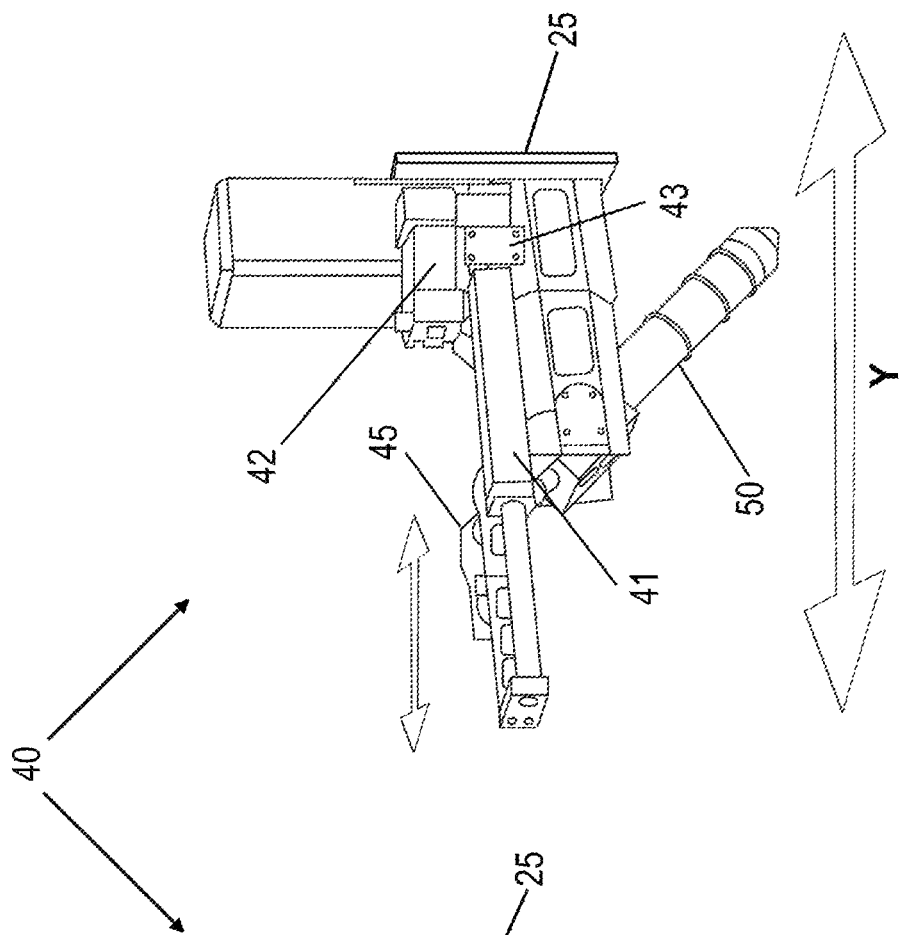
FIGS. 10A-10B show an embodiment of the bevel head showing action along the Y-axis.
Figure 10A:
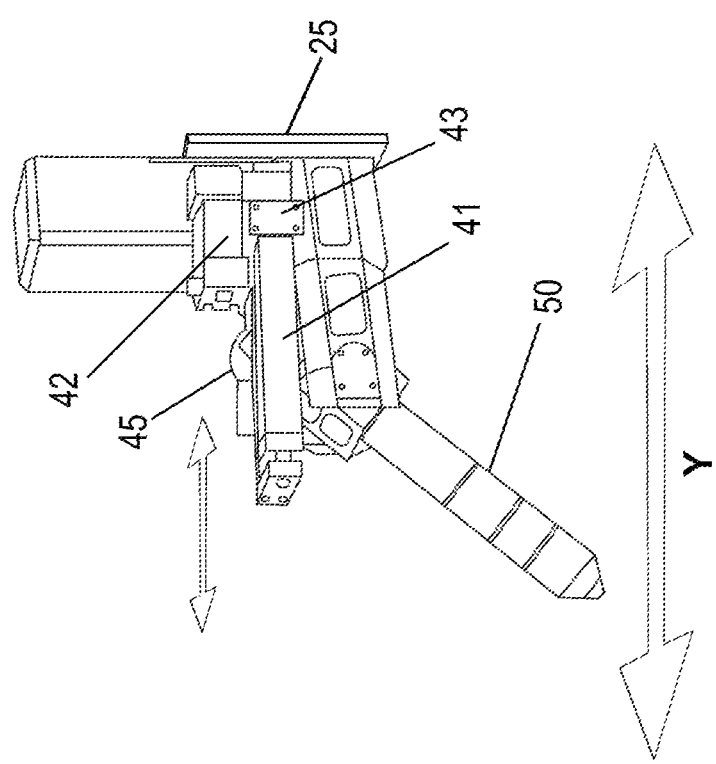

Turning now to FIG. 10A-10B, the actuator assembly 40 is shown (with Z-axis assembly 20 omitted for clarity and rotation motor mount 25 numbered as a reference) pivoting the torch 50 along the Y-axis. As shown, the linear actuator 41 can be controlled by a motor 42 and can be affixed to the actuator assembly 40 via actuator holder 43. When activated, linear actuator 41 can extend and can put pressure against the pivot arm 45, which inverts the action of the linear actuator 41, as shown, by the position of the torch 50 in FIGS. 10A-10B (torch 50 is swept back towards the assembly to the maximum extent when linear actuator 41 is extended to its maximum extent).

Returning briefly to FIG. 8, the view shows actuator assembly 40 additionally comprising distance sensing laser 140, which can sense the distance between the torch 50 and a workpiece. The torch pivot point 145 is also shown for translating the action of the linear actuator 41 to the action of the pivot arm 45.

Returning briefly to FIG. 7, the distance sensing laser 140 is shown in greater detail, including laser door 141 which can selectively open and close to protect the lens of distance sensing laser 140 when not in use.

Figure 11:
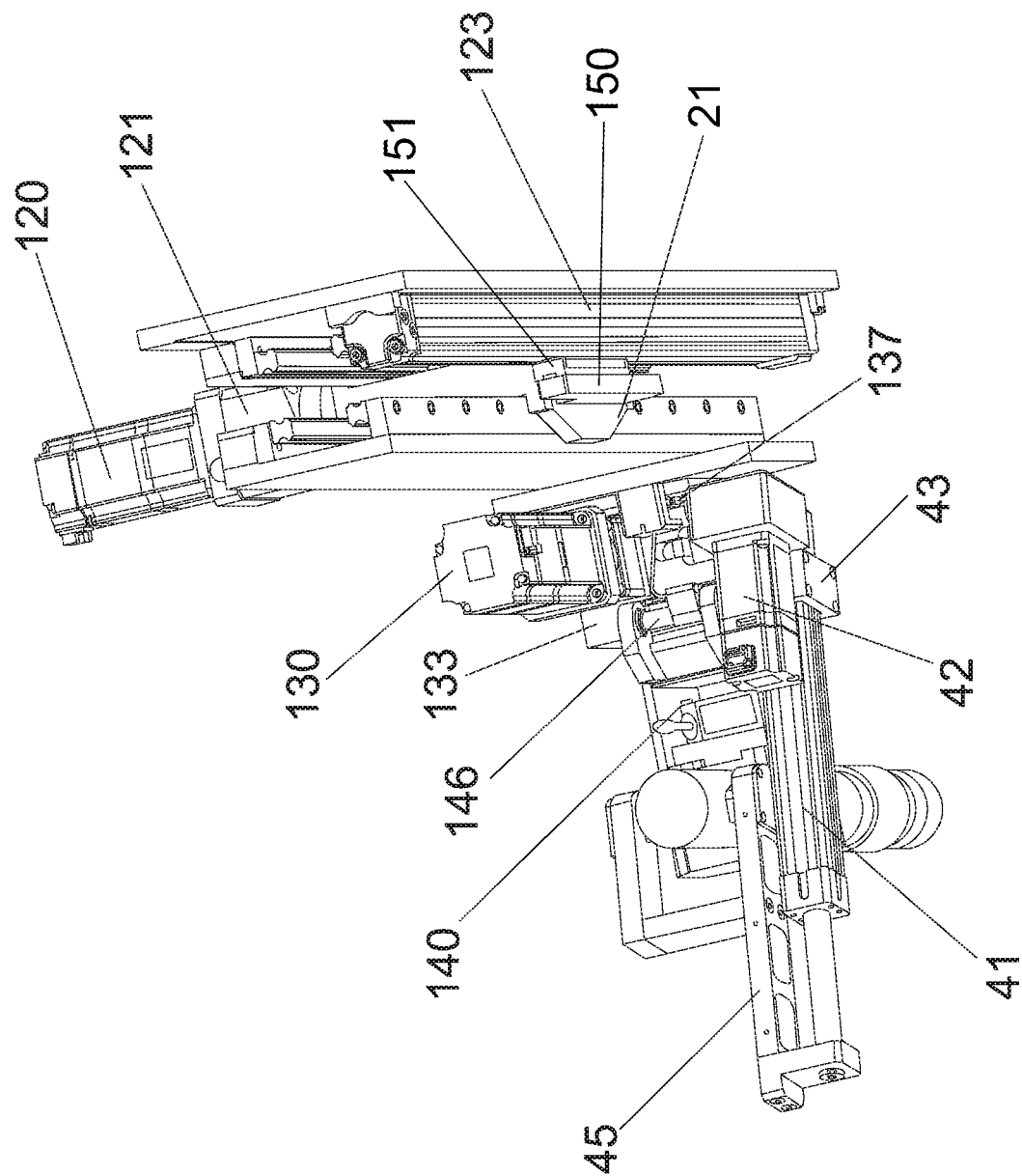
FIG. 11 shows an overhead view of the bevel head assembly with additional components labeled.

Finally, in FIG. 11, the overhead view shows the far end of the pivot arm 45 attached to the linear actuator 41, which can be affixed to the actuator assembly 40 via actuator holder 43. As further shown in FIG. 5 and FIG. 11, the counter balance 123 can comprise a counter balance carriage 151 that can mate or connect with a counter balance carriage plate 150 for connecting the counter balance 123 with the Z-axis motor mount assembly 21.

Figure 12:
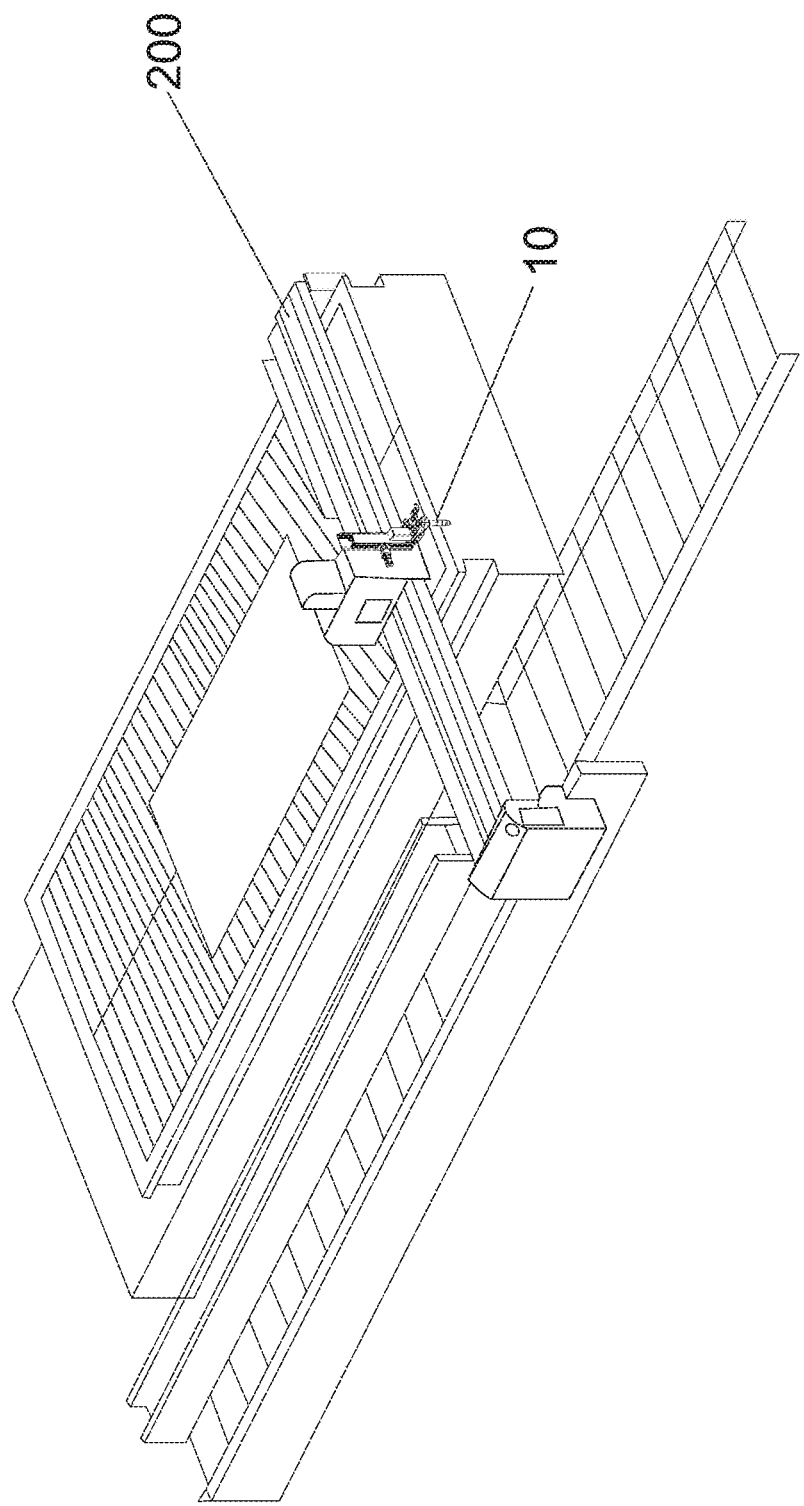
FIG. 12 shows the bevel head cutter in use in conjunction with a gantry and a work table.

FIG. 12 shows the bevel head assembly 10 mounted on a gantry 200 over a work table and conveyor system. In an exemplary embodiment, the bevel head assembly 10 is utilized in conjunction with the gantry 200 and a work table in order to efficiently and safely process multiple workpieces.

Although exemplary embodiments and methods of the present invention have been described herein in detail, those skilled in the art will readily recognize that numerous apparatus shapes are readily imagined, and various substitutions and modifications can be made to the apparatus without departing from the scope and spirit of the appended claims.

The invention claimed is:

1. A bevel head assembly for directing a cutting device, comprising:
   a first motor assembly operably connected to the cutting device and mounted to a first plate, wherein the first motor assembly controls the movement of the cutting device along a first rotational axis;
   a second motor assembly operably connected to the first plate and mounted to a second plate, wherein the second motor assembly rotates the first motor assembly such that the cutting device is moved along a second rotational axis perpendicular to the first rotational axis; and
   a third motor assembly operably connected to the second plate, wherein the third motor assembly elevates and lowers the second motor assembly, first motor assembly, and cutting device in a vertical axis,
   wherein the first motor assembly, second motor assembly, and third motor assembly are capable of simultaneous operation.

2. The bevel head assembly of claim 1, wherein the first motor drives a linear actuator.

3. The bevel head assembly of claim 2, wherein the linear actuator is operably connected to the cutting device by a pivoting arm.

4. The bevel head assembly of claim 1, wherein the operable connection between the second motor assembly and the first plate is magnetic.

5. The bevel head assembly of claim 4, further comprising a switch monitoring the operable connection between the second motor assembly and the first plate.

6. The bevel head assembly of claim 5, wherein the switch shuts down the bevel head assembly when the connection is not detected.

7. The bevel head assembly of claim 1, wherein the third motor assembly comprises a motorized pinion gear, a first rack, and a second rack.

8. The bevel head assembly of claim 7, wherein the rotation of the motorized pinion gear drives the first rack in a first direction and the second rack in a second direction.

9. The bevel head assembly of claim 7, wherein the third motor assembly comprises a motor and gearbox mounted to a first side.

10. The bevel head assembly of claim 7, wherein the third motor assembly comprises a counterbalance mounted to a second side opposite the first side.

11. The bevel bead assembly of claim 1, wherein the first motor assembly comprises a distance sensing laser mounted in line with the cutting device.

12. The bevel head assembly of claim 1, wherein the second motor assembly comprises a home switch and a groove, wherein a position of the home switch within the groove corresponds to a neutral orientation of the second motor assembly.

13. A method of shaping a beam with a cutting device, the method comprising:
    raising and lowering the cutting device over a workpiece by means of a vertical motor assembly comprising a motorized pinion gear and at least one rack, wherein the pinion gear travels up and down the rack;
    rotating the cutting device around a workpiece in a first rotational axis by means of a rotational motor assembly connected to the vertical motor assembly, the rotational motor assembly comprising a rotational motor and at least one gearbox; and
    rotating the cutting device around a workpiece in a second rotational axis by means of a linear actuator connected to the rotational motor assembly, wherein the linear actuator is in a pivotal relationship with the cutting device.

14. The method of claim 13, further comprising the step of disconnecting the linear actuator from the rotational assembly by means of a switch operably connected to a magnetic plate between the linear actuator and the rotational assembly.

15. The method of claim 13, wherein the step of raising and lowering the cutting device over the workpiece further comprises traveling the pinion gear up and down a second rack opposite the first rack.

16. The method of claim 14, wherein the step of traveling the pinion gear up and down a second rack opposite the first rack further comprises moving the first rack and the second rack in opposing vertical directions.

* * * * *